United States Patent
Scott et al.

(10) Patent No.: US 7,566,038 B2
(45) Date of Patent: Jul. 28, 2009

(54) RAIL CLAMP

(75) Inventors: Christopher P. Scott, Hackensack, NJ (US); Jason R. Cahayla, Saddle Brook, NJ (US); Richard A. Modes, Hopatcong, NJ (US); John A. Griecci, Redondo Beach, CA (US)

(73) Assignee: Surgical Concept Designs, LLC, Hackensack, NJ (US)

( * ) Notice: Subject to any disclaimer, the term of this patent is extended or adjusted under 35 U.S.C. 154(b) by 0 days.

(21) Appl. No.: 11/827,227

(22) Filed: Jul. 11, 2007

(65) Prior Publication Data
US 2009/0013507 A1 Jan. 15, 2009

(51) Int. Cl.
*A47B 96/06* (2006.01)
(52) U.S. Cl. ............... 248/231.61; 248/227.4; 248/228.3; 24/535; 600/230; 5/600; 403/385
(58) Field of Classification Search ............ 248/231.61, 248/229.12, 229.14, 229.22, 229.24, 227.1, 248/227.4, 228.3, 228.5, 231.85, 231.41; 600/230; 5/600, 601; 403/385; 24/535
See application file for complete search history.

(56) References Cited
U.S. PATENT DOCUMENTS

| | | | | |
|---|---|---|---|---|
| 4,487,523 A | * | 12/1984 | Monroe | ............... 403/385 |
| 4,718,151 A | * | 1/1988 | LeVahn et al. | ............... 24/535 |
| 4,796,846 A | * | 1/1989 | Meier et al. | ............... 248/286.1 |
| 4,852,841 A | * | 8/1989 | Sebring | ............... 248/231.31 |
| 4,901,964 A | * | 2/1990 | McConnell | ............... 248/231.51 |
| 6,499,158 B1 | | 12/2002 | Easterling | |
| 6,572,390 B2 | * | 6/2003 | Ladin | ............... 439/92 |
| 6,622,980 B2 | * | 9/2003 | Boucher et al. | ............... 248/231.51 |
| 6,912,959 B2 | | 7/2005 | Kolody et al. | |
| 7,003,827 B2 | | 2/2006 | DeMayo | |
| 7,097,616 B2 | * | 8/2006 | Bjork et al. | ............... 600/230 |

OTHER PUBLICATIONS

"International Search Report and Written Opinion of the International Searching Authority" for corresponding International Application No. PCT/US07/16743, mailed Sep. 23, 2008.

* cited by examiner

*Primary Examiner*—Anita M King
(74) *Attorney, Agent, or Firm*—The Law Office of John A. Griecci

(57) ABSTRACT

A clamp for attaching a medical device to an OR table rail, including two closable clamp jaws that close to an extreme position that leaves inadequate room for the rail. A handle actuates the jaws apart, and a spring biases them together through a range of jaw positions. A lock member is biased to swing through a range of lock positions in which it progressively engages and locks the jaw mechanism through its range of jaw positions. A pair of bars carries the medical device on the clamp, and allows it to be adjustably positioned with respect to the rail.

10 Claims, 9 Drawing Sheets

RAIL CLAMP

The present invention relates generally to a support apparatus for a medical device, and more particularly, to a manually operated rail clamp for attaching a surgical device to a side rail of an operating table.

BACKGROUND OF THE INVENTION

A variety of surgical devices, such as instrument positioners, limb positioners, stirrups, and drape screens, are routinely attached to OR (operating room) tables during surgical procedures. To support such surgical devices, OR tables are generally provided with rails on either side of the table, extending along the length of the table. The rails are generally of a common configuration and dimension (e.g., commonly having a rectangular cross-section of 1⅛" by ⅜" in the U.S.), but are not typically manufactured and maintained with tight dimensional tolerances that are amenable to quick-attachment mechanisms.

Typically, each surgical device is provided with a rail clamp configured to clamp on to the OR table rail at a position determined by the needs of the medical practitioner (e.g., a surgeon). Using the rail clamp, the surgical device is attached to a rail prior to or at the beginning of each surgical procedure, and removed again after the surgical procedure is completed.

Typical rail clamps are provided with a threaded hand-screw that is manually turned to clamp the rail clamp onto a rail. The screw may be configured to actuate directly into contact with the rail in opposition to a fixed portion of the clamp (thereby clamping on the rail), or it may be used to actuate a movable portion of a clamp mechanism in opposition to a fixed portion of the clamp to clamp on the rail. The hand-screw may be provided any of a variety of head shapes intended to simplify the task of repeatedly turning the hand-screw.

The various threaded screw designs typically provide for a rail clamp to be opened and closed with enough motion to allow adequate clearance for placement onto and removal from a rail. Moreover, the threaded screw designs typically provide for a rail clamp that can firmly lock onto a rail manufactured with loose tolerances (i.e., that can vary significantly in size). Nevertheless, such rail clamp designs require a user to hold the surgical device in place with one hand while doing extensive manual screw-turning with the other. Thus, such rail clamp mechanisms can be cumbersome and time consuming to affix to an OR table.

Accordingly, there has existed a need for a simple, ergonomic device for quickly and removably affixing a surgical device to a table. More particularly, there has existed a need for a clamp that provides a user with the ability to easily and quickly engage and disengage the surgical device from an OR table rail, that provides sufficient mechanical fixation to react the multidirectional forces to which it may be subjected, that provides for the position of the surgical device to be easily adjusted, and that does so for OR table rails characterized by dimensions that can deviate from tight tolerances, such as is typical for a surgical table rail. Preferred embodiments of the present invention satisfy these and other needs, and provide further related advantages.

SUMMARY OF THE INVENTION

In various embodiments, the present invention may solve some or all of the needs mentioned above. Typical embodiments of the invention provide a clamp mechanism for a surgical device that allows a user to open a clamp jaw wide enough to easily navigate around a mount structure such as a rectangular OR (operating room) table rail, and yet offer a secure locking grip, while allowing for a loose dimensional tolerance on the rail.

A typical clamp under the invention includes an actuation mechanism configured to actuate a clamp mechanism. The clamp mechanism includes a first clamp member connected to a second clamp member, the two being movable relative to one another between a first clamp-mechanism position and a relative second clamp-mechanism position. In its first position, the clamp mechanism allows adequate clearance for the mount structure to be inserted between and/or within the clamp members. However, in its second position, the clamp mechanism has inadequate room for the mount structure between the clamp members.

The actuation mechanism includes a first bias member, and a handle that is movable between a typically extreme, first handle position and an extreme, second handle position. With the handle in its extreme, first position, the actuation mechanism is configured to actuate the clamp mechanism to its first position. With the handle in its extreme, second position, the actuation mechanism is configured to actuate the clamp mechanism toward and to its second position.

Advantageously, with the handle in its extreme, second position, the bias member is configured to resiliently bias the clamp members toward their relative second clamp-mechanism positions. Thus, with a mount structure inserted between the clamp members (blocking them from reaching their respective second clamp-mechanism positions) and the handle moved all the way to its extreme, second position, the bias member biases the clamp mechanism, but allows the clamp mechanism to approach its second position without reaching it, and the clamp mechanism thereby tightly grips the mount structure.

The actuation mechanism further includes a lock member and a second bias member. The lock member moves relative to the clamp mechanism between a first lock-member position and a second lock-member position. The second bias member biases the lock member toward its second position. The handle is configured to actuate the lock member to its first position when the handle is actuated to its extreme, first position.

Advantageously, the clamp mechanism defines a lock-engagement surface configured such that, as the clamp mechanism moves through a range of clamp-mechanism positions toward the second clamp-mechanism position, the lock member can progressively engage the lock-engagement surface in a range of lock-member positions progressing toward the second lock-member position. For any given clamp-mechanism position approaching the second clamp-mechanism position, the respective progressively engaged lock member blocks the clamp mechanism from moving back toward its first position. This feature provides for the lock member to lock the clamp mechanism in place in any of the range of positions in which it may be located while the clamp mechanism is gripping the mount structure.

In its first position, a portion of the swing lock such as the lock member, may optionally block the handle from reaching its extreme, second position. Thus, if the clamp mechanism is stuck in or close to its first position (e.g., if it is not correctly positioned around the mount structure), then the lock member will prevent the handle from reaching its extreme, second position, and a medical practitioner clamping the rail clamp will become aware that the clamp member has not properly clamped onto the mount structure.

The clamp further includes a housing that is part of and integrates the clamp mechanism and the actuation mechanism, a longitudinally extending support member slidably received by the housing, the support member having a reception portion configured for receiving the surgical device, and a manually releasable support lock configured to lock the position of the support member with respect to the housing. Advantageously, this provides for the surgical device to be positionally adjusted with respect to the mount structure for a given location of the clamp.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Figure 2:
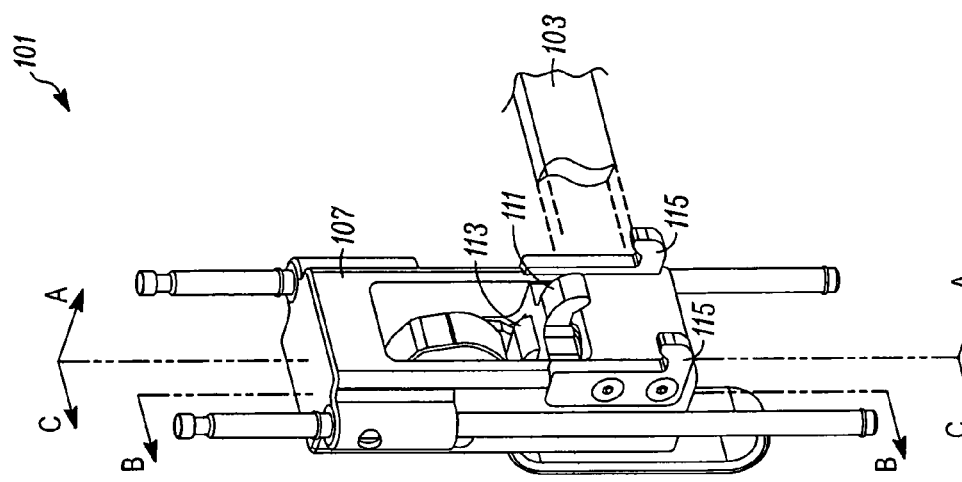
FIG. 2 is a front perspective view of the rail clamp depicted in FIG. 1.
Figure 1:
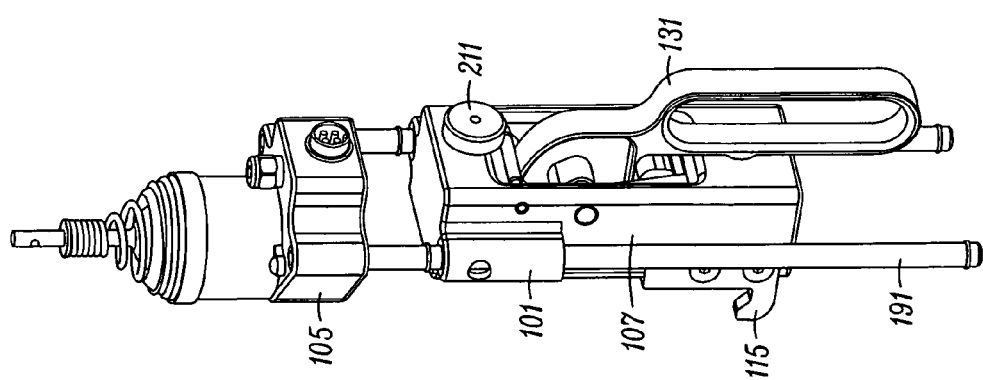
FIG. 1 is a rear perspective view of a first rail clamp embodying the present invention, attached to a base of a multi-jointed surgical device.
Figure 3:
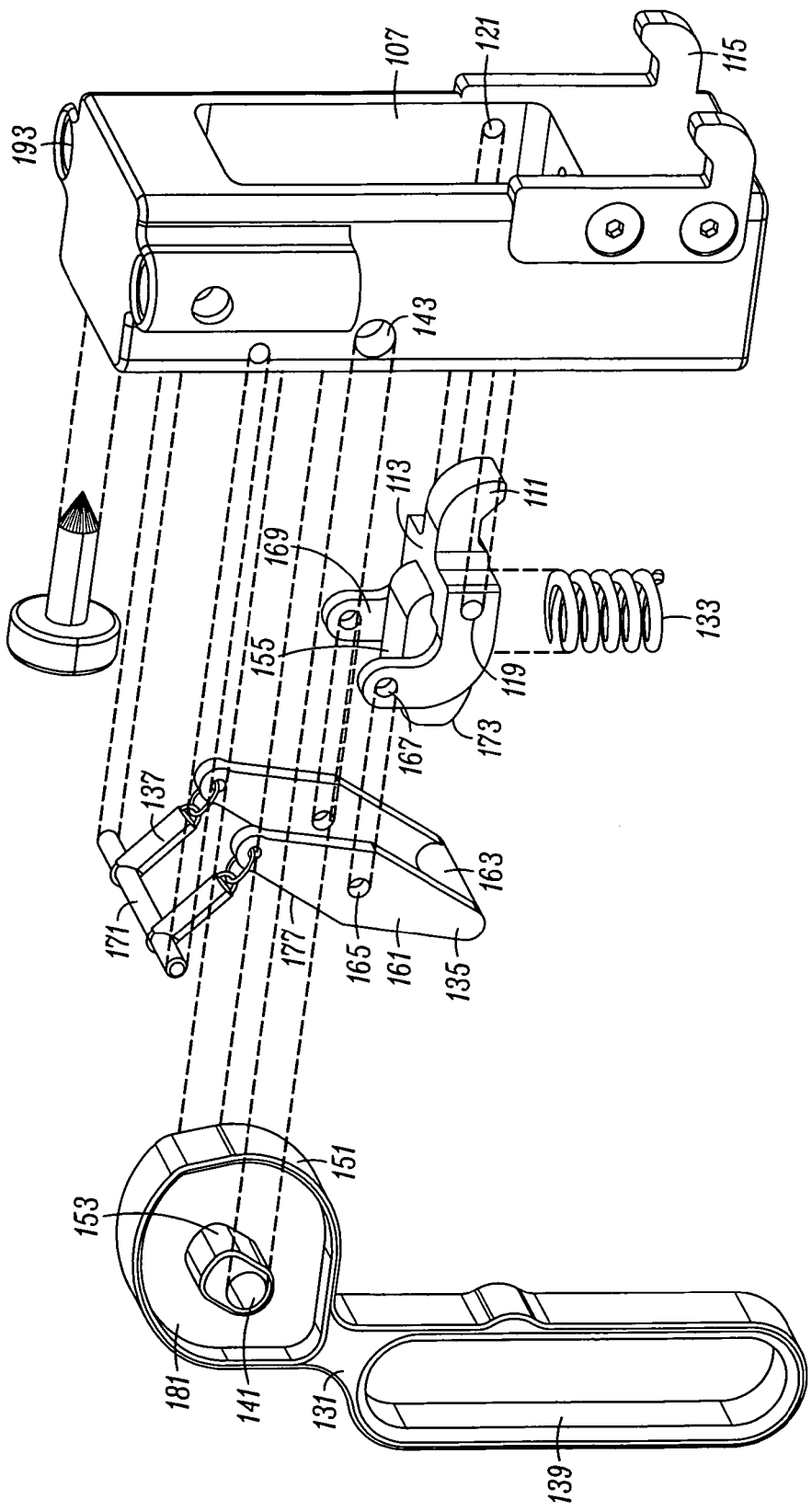
FIG. 3 is an exploded, second front perspective view of the rail clamp depicted in FIG. 2, the rail clamp having two support members removed for clarity.
Figure 5:
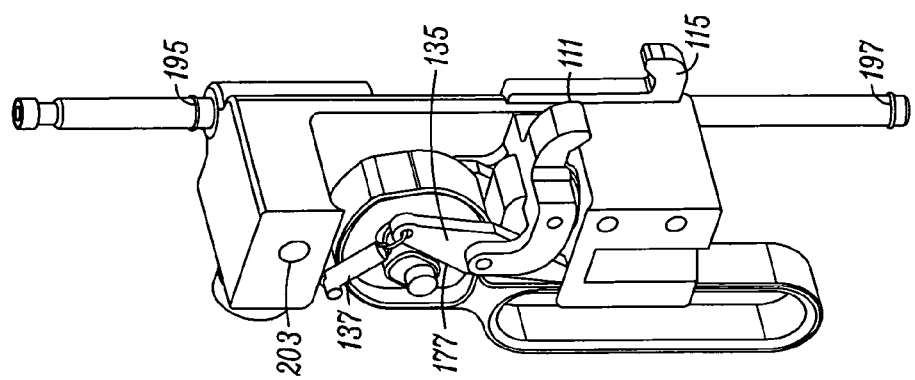
FIG. 5 is a cross-sectional view of the front perspective view of FIG. 2, taken along line B-B of FIG. 2.

With reference to FIGS. 1 & 2, the first embodiment of the invention is a rail clamp 101 configured to clamp on a mount structure in the form of a rail 103 of an OR (operating room) table. The rail clamp is configured to carry a base 105 of a surgical device, such as a multi-jointed fixture for holding a retractor. The rail clamp includes an actuation mechanism and a clamp mechanism. The actuation mechanism is configured to actuate the clamp mechanism so as to clamp the housing on to the rail. The rail clamp further includes an adjustable support mechanism configured for controllably adjusting the vertical position of the base with respect to the housing. A housing 107 integrates, and is part of, the actuation, clamp and support mechanisms.

With reference to FIGS. 1-6, the clamp mechanism includes clamp members in the form of an upper jaw 111 that is an integral part of a swing clamp 113, and a pair of laterally spaced lower jaws 115 rigidly mounted on the housing 107. The upper jaw is longitudinally spaced from the lower jaws along an actuation axis 117, and is laterally spaced intermediate the lower jaws. The upper and lower jaws include opposing flanges 118 extending longitudinally toward one another to form a C-shaped jaw when viewed laterally (see, e.g., FIG. 6).

The swing clamp 113 defines a first pin channel 119, and is hingedly mounted to the housing 107 using a pin extending laterally through a first pair of pin holes 121 in the housing, and through the pin channel. The swing clamp is thereby fixed within the housing, but free to pivot around a laterally extending swing-clamp axis that is fixed with respect to the housing through the first pair of pinholes 121. The swing-clamp axis extends through the swing-clamp first pin channel 119, which is at a swing-clamp location that provides for the upper jaw to substantially move longitudinally up and down with respect to the lower jaws when the swing clamp pivots around the swing-clamp axis.

The C-shaped jaw of the clamp mechanism defines an open, first clamp-mechanism position in which the upper jaw is more distantly spaced from the lower jaw (see, FIG. 7), and a extreme, closed, second clamp-mechanism position in which the upper jaw is more closely spaced from the lower jaw (not depicted). The open, first claim-mechanism position provides adequate clearance for the rail of the mount structure to be inserted between the jaws of the clamp members. The extreme, closed, second clamp-mechanism position brings the clamp members close enough to leave inadequate room for the mount structure rail between the clamp members. In the context of this application it should be understood that an "extreme" position is a position in which a movable object has moved to its greatest degree in one direction, such as might occur when hitting a stop that is part of the overall structure.

Figure 4:
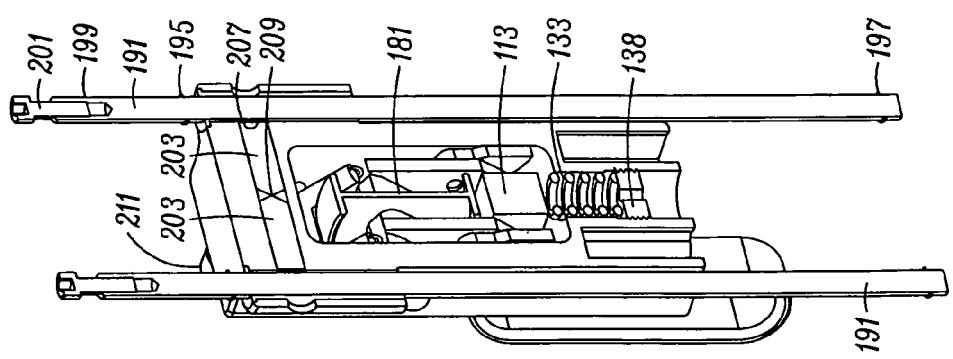
FIG. 4 is a cross-sectional view of the front perspective view of FIG. 2, taken along line A-A of FIG. 2.
Figure 6:
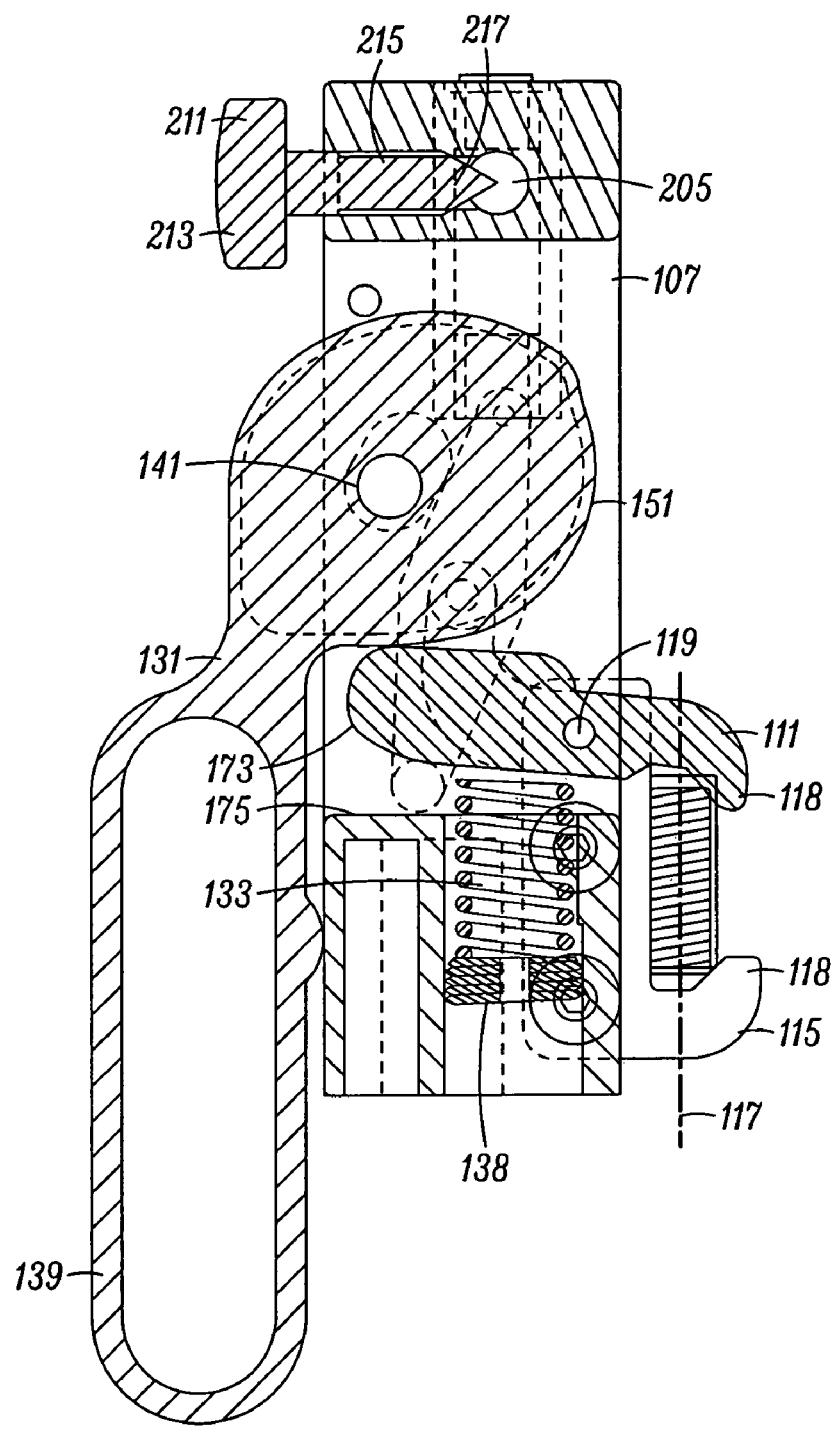
FIG. 6 is a cross-sectional left side view of the rail clamp depicted in FIG. 2, taken along line C-C of FIG. 2.
Figure 7:
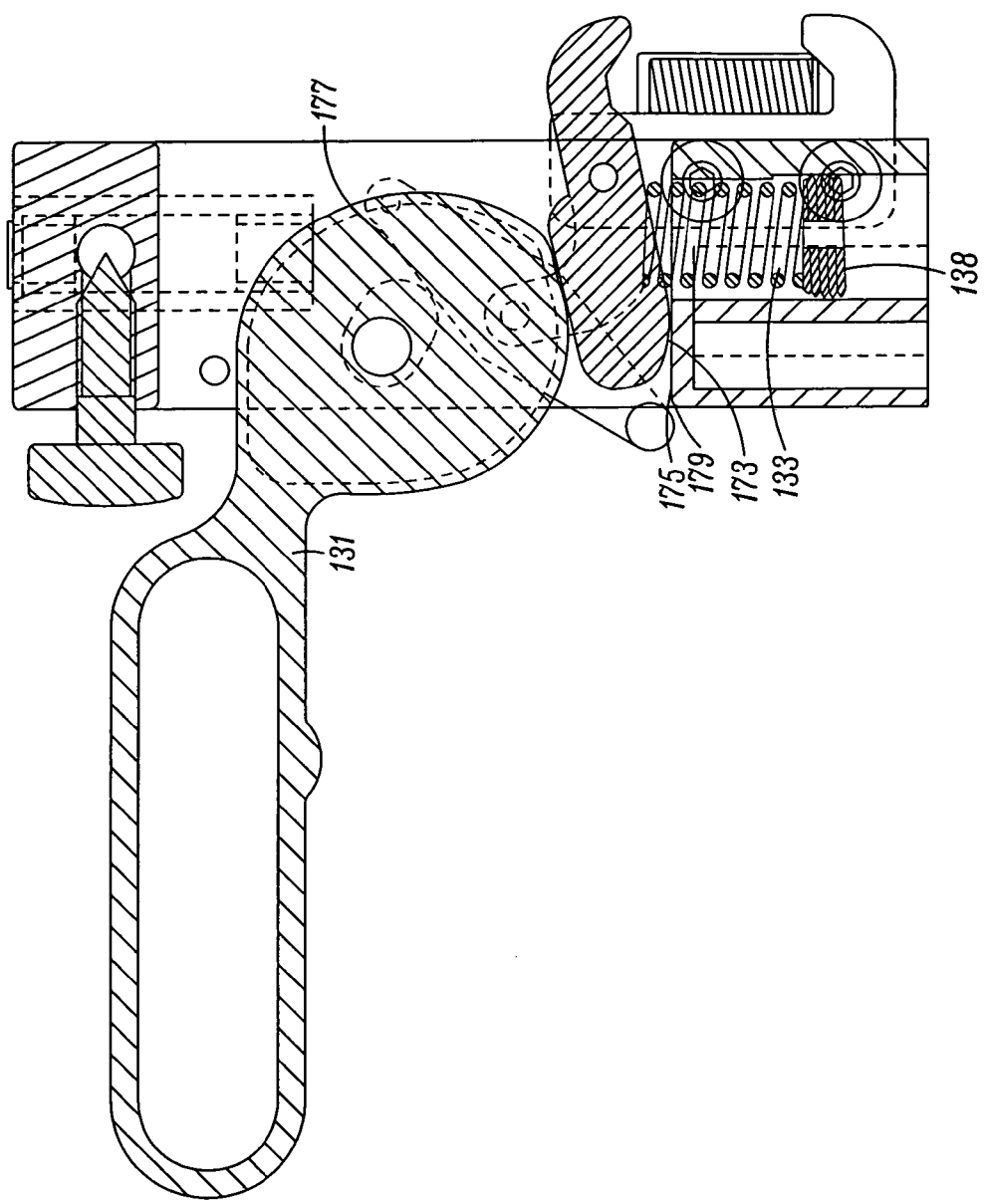
FIG. 7 is the cross-sectional left side view of FIG. 6, with a handle actuated to an extreme, first handle position.

With reference to FIGS. 1-7, the actuation mechanism includes a handle 131 that is movable between an extreme, open, first handle position (as depicted in FIG. 7) and a extreme, closed, second handle position (as depicted in FIGS. 1-6). The actuation mechanism further includes a swing lock 135, a first bias member in the form of a swing-clamp spring 133, and a pair of second bias members in the form of a pair of a swing-lock springs 137. The swing-clamp spring is configured and positioned with respect to the swing-clamp axis such that it biases the swing clamp to pivot toward and into its extreme, closed, second position, and thereby, the swing-clamp spring is configured to react between the clamp members to bias the clamp mechanism toward the second clamp-mechanism position. As depicted in FIGS. 4, 6 & 7, the swing-clamp spring 133 is held in place within the housing and adjustably loaded against the swing clamp by a threaded insert 138.

The handle 131 includes a grip 139 configured to be held by a user's hand (e.g., a medical practitioner's hand). The handle defines a pin channel 141, and is hingedly mounted to the housing 107 using a pin extending laterally through a second pair of pin holes 143 in the housing, and through the handle pin channel. The handle is thereby fixed within the housing, but free to pivot around a laterally extending handle axis that is fixed with respect to the housing through the second pair of pinholes 143.

The handle axis extends through the handle pin channel 141, which is at a handle location that provides the grip with leverage to be actuated 90 degrees by a user's hand such that the handle pivots around the handle axis between the extreme, open, first handle position and the extreme, closed, second handle position in a single, quick-attach or quick-release actuation motion, using a reasonable level of manual force and a comfortable range of motion. The 90 degree range of motion is believed to provide a convenient balance between the desire for leverage (i.e., low force) and a comfortable quick-action range of motion (i.e., a range in which one can comfortably accomplish the attachment/removal process in one motion).

The handle 131 further defines a first-cam surface 151 and a second-cam surface 153. With the handle in its extreme, open, first position, the first-cam surface of the actuation mechanism forms an actuation surface configured to directly actuate an actuation surface 155 of the swing clamp, driving the clamp mechanism (and in particular the upper jaw) to move against the bias of the swing-clamp spring 133 to the open, first clamp-mechanism position. Thus, with the handle in its first position, the actuation mechanism is configured to actuate the clamp mechanism to the open, first clamp-mechanism position even though the swing-clamp spring directly biases the swing clamp to pivot into its closed, second clamp-mechanism position.

When the handle is actuated down to its extreme, closed, second position, the first-cam surface 151 turns such that it no longer drives the clamp mechanism to its open, first position. This releases the swing clamp to pivot under the bias of the swing-clamp spring 133 to (or toward) the extreme, closed, second position. Thus, with the handle in its extreme, closed, second position, the actuation mechanism is configured to actuate the clamp mechanism to the second clamp-mechanism position, and in particular, the swing-clamp spring biases the swing clamp to pivot toward its extreme, closed, second position.

As noted above, in its extreme, closed, second position, the clamp mechanism has its clamp members (i.e. the upper and lower jaws) close enough to leave inadequate room for the mount structure rail 103 between them. Thus, if the rail is received between the clamp members while the handle 131 is in its first position, then when the handle is pivoted to its second position, the clamp members will be biased to move toward their extreme, closed, second position, but they will not reach it. Instead, the clamp members will grippingly clamp around the rail under the force of the swing-clamp spring 133.

While the swing-clamp spring 133 provides a bias to make the clamp members grip the rail, it will be understood that the grip will be subject to forces and torques received from the base 105, which under some circumstances could be adequate to overcome the bias. The swing lock 135 of the actuation mechanism includes a lock member that in combination with the swing-lock springs 137 can lock the swing clamp in progressively more closed positions as it moves under the bias of the swing-clamp spring 133 to (or toward) its position in the extreme, closed, second clamp-mechanism position.

More particularly, the swing lock 135 includes two symmetric flanges 161 and an intermediate lock member 163 connecting the two flanges at a common end of each flange. Each flange defines a pin channel 165 in its center, the pin channels being concentric. Using one of two respective pins, these pin channels are each hingedly mounted to one of two respective pin holes 167 on one of two respective reception flanges 169 integral with the swing clamp 113. The swing lock is thereby fixedly attached to the swing clamp, but free to pivot around a laterally extending swing-lock axis that moves with respect to the housing as the swing clamp pivots with respect to the housing. The swing-lock axis extends through the swing-clamp reception flange pin holes 167, which are at a swing-clamp location that provides for the lock member 163 to swing approximately forward and back with respect to the swing clamp when the swing lock pivots around the swing-lock axis.

The swing-lock springs 137 bias a second end of each swing-lock flange 161 toward a pin 171 affixed to the housing. This biases the lock member 163 to rotate forward, relative to the swing clamp from a first lock-member position toward an extreme, second lock-member position. The clamp-mechanism swing clamp defines a lock-engagement surface 173 and the housing defines a lock-engagement surface 175 configured such that, as the swing clamp moves through a range of clamp-mechanism positions toward its second clamp-mechanism position, the lock member can engage and become wedged between the lock-engagement surfaces in a range of lock-member positions progressing toward the second lock-member position.

With the handle in its extreme, open, first position, the second-cam surface 153 of the actuation mechanism is configured as an actuation surface to actuate against an actuation surface 177 of the swing lock, holding the lock member 163 against the bias of the swing-lock springs 137 at the open, first lock-member position. With the handle moving up toward its extreme, first position, the actuation mechanism is configured to actuate the swing lock progressively out of the way of the housing lock-engagement surface 175 as the clamp mechanism moves toward the open, first clamp-mechanism position even though the swing-lock spring directly biases the swing lock to pivot into its extreme, closed, second lock-member position. Thus, the handle is configured to actuate the lock member to its first position when the handle is actuated to its extreme, first position.

When the handle is moved from its extreme, open, first position, down towards its second position, the first-cam surface 151 and second-cam surface 153 release their respective actuation surfaces, allowing them to move under the bias of their springs. Optionally, if something (such as an incompletely inserted rail) impedes the swing clamp 113 from proceeding from its open, first position significantly toward its second position, then a blocking-surface 179 of the housing may impede the lock member from swinging forward between the lock-engagement surfaces 173 & 175. The impeded lock member may optionally be configured to block the handle and prevent it from reaching its extreme, second handle position, thereby alerting a user that the clamp mechanism has not adequately closed to grip the rail.

The actuation and clamp mechanisms are provided with laterally symmetrical configurations to efficiently carry loads. The handle 131 includes a central flange 181 connecting the first-cam surface 151 and the second-cam surface 153, each of which extends symmetrically out in lateral directions from either side of the central flange. The swing-lock flanges extend symmetrically around a portion of the handle to be positioned for actuation by the second-cam surface 153. The flanges of the swing clamp extend symmetrically on either side of the swing-lock flanges to carry the swing lock. Thus, the clamp, actuation and support mechanisms include the housing, and are laterally symmetric.

With reference to FIGS. 1 & 3-6, the rail clamp adjustable support mechanism includes a pair of laterally spaced support members, each in the form of a longitudinally extending bar 191, for carrying the base 105 with respect to (and vertically above) the housing 107. The bars are slidably received in conforming longitudinal shafts 193 formed in the housing. The bars are generally parallel to the actuation axis 117 of the jaws, and are slidable in the direction of the actuation axis. The bars are configured with upper stops 195 and lower stops 197 to define a range of longitudinal motion and prevent the bars from traveling too low or too high, respectively, with respect to the housing. The base is removably connected to a reception portion 199 at an upper end of each bar by a screw 201 threadedly received in the upper end of each bar.

The base 105 can be locked in any given vertical location along the possible positions allowed by the bars' range of motion. To provide for this locking in place, the adjustable support mechanism has a support lock that includes two generally cylindrical lock-bars 203 received in a single, lateral, cylindrical shaft 205 in the housing. The lateral shaft extends between, and intersects with, the two longitudinal shafts 193. The lock-bars are each configured with outer ends 207 adapted to abut and be pressed against one of the bars 191 to hold the bar longitudinally in place, and conically pointed inner ends 209 that opposingly face and closely approach one another.

The lock-bars 203 can be manually actuated against, and manually released from holding, the bars 191 by a threaded hand screw 211, which is also part of the support lock. The hand screw includes a manually turnable head 213, a threaded body 215 configured to be conformingly received in a threaded bore in the housing 107, and a conically pointed head 217. The hand-screw threaded bore intersects the lateral shaft 205 intermediate the lateral position of the two bars 191, and is centered at a location where the lock-bars' pointed inner ends 209 face one another. When the pointed end of the hand screw is screwed in to meet the pointed ends of the lock-bars, the lock-bars are driven laterally outward to lock the bars 191 in place.

With reference to FIGS. 8A-8D, a second embodiment of the invention is a rail clamp 301 configured to clamp on a mount structure in the form of a rail 303 of an OR table. The rail clamp is configured to carry a base of a surgical device, such as a multi-jointed fixture for holding a retractor. The rail clamp includes a housing 307, an actuation mechanism and a clamp mechanism. As with the first embodiment, the actuation mechanism is configured to actuate the clamp mechanism so as to clamp the housing on to the rail, and the rail clamp further includes an adjustable support mechanism configured for controllably adjusting the vertical position of the base with respect to the housing. The clamp, actuation and support mechanisms are integrated by the housing, and are similar in form to those of the first embodiment (and therefore are similarly numbered), and vary only as described below and in the figures.

As with the first embodiment, the clamp mechanism includes similar clamp members in the form of an upper jaw 311 that is an integral part of a swing clamp 313, and a pair of laterally spaced lower jaws 315 rigidly mounted on the housing 307, with the upper jaw being longitudinally spaced from the lower jaws along an actuation axis, and with the upper jaw being laterally spaced intermediate the lower jaws.

As with the first embodiment, the swing clamp 313 is hingedly mounted to the housing 307 and pivots about a first pin channel 319. The C-shaped jaw of the clamp mechanism defines an open, first clamp-mechanism position in which the upper jaw is more distantly spaced from the lower jaw (see, FIG. 8A), and an extreme, closed, second clamp-mechanism position in which the upper jaw is more closely spaced from the lower jaw (not depicted). The open, first clamp-mechanism position provides adequate clearance for the rail of the mount structure to be inserted between the jaws of the clamp members. The extreme, closed, second clamp-mechanism position brings the clamp members close enough to leave inadequate room for the mount structure rail between the clamp members.

Figure 8A:
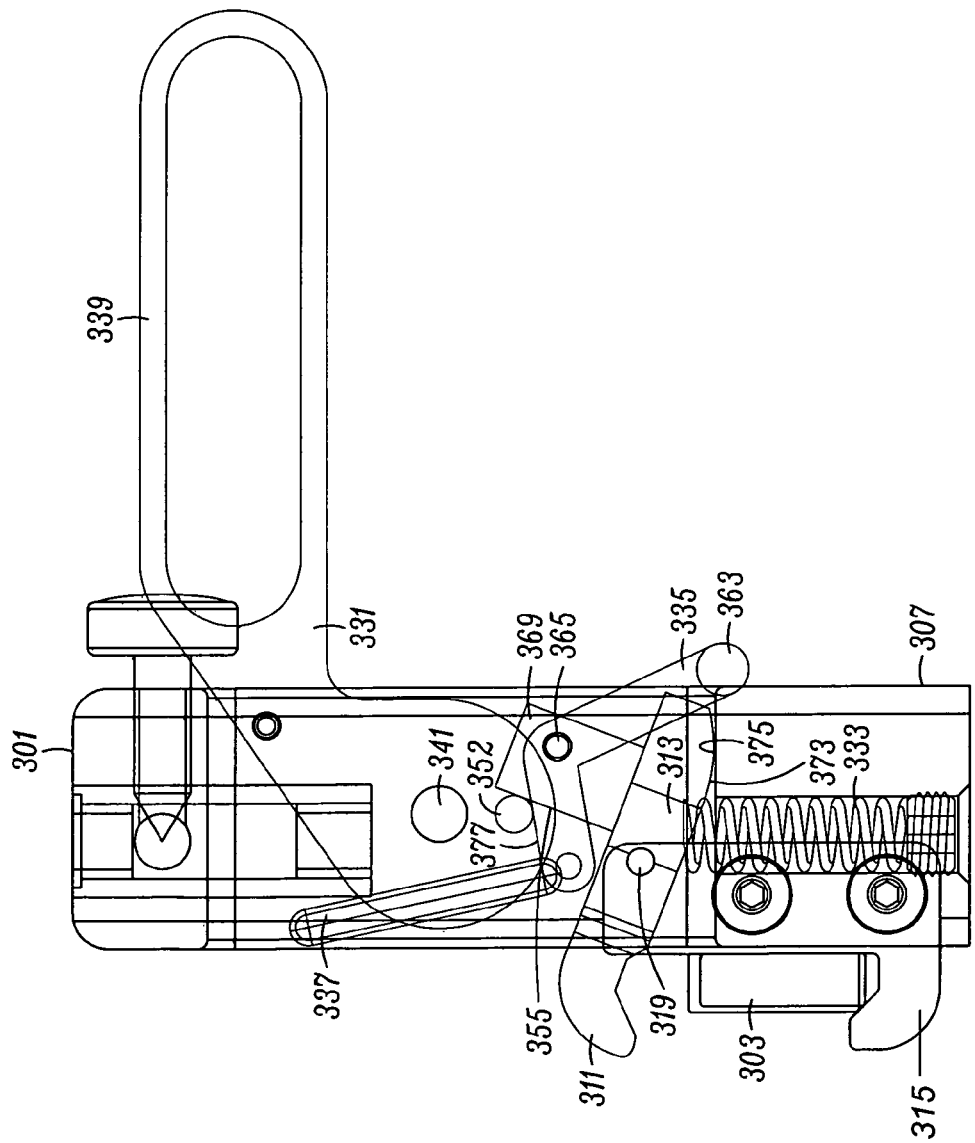
FIG. 8A is a right side parts drawing, showing all parts as if they were transparent, of a second rail clamp embodying the invention, with the handle in an open, first handle position, and with the rail clamp having two support members removed for clarity.
Figure 8B:
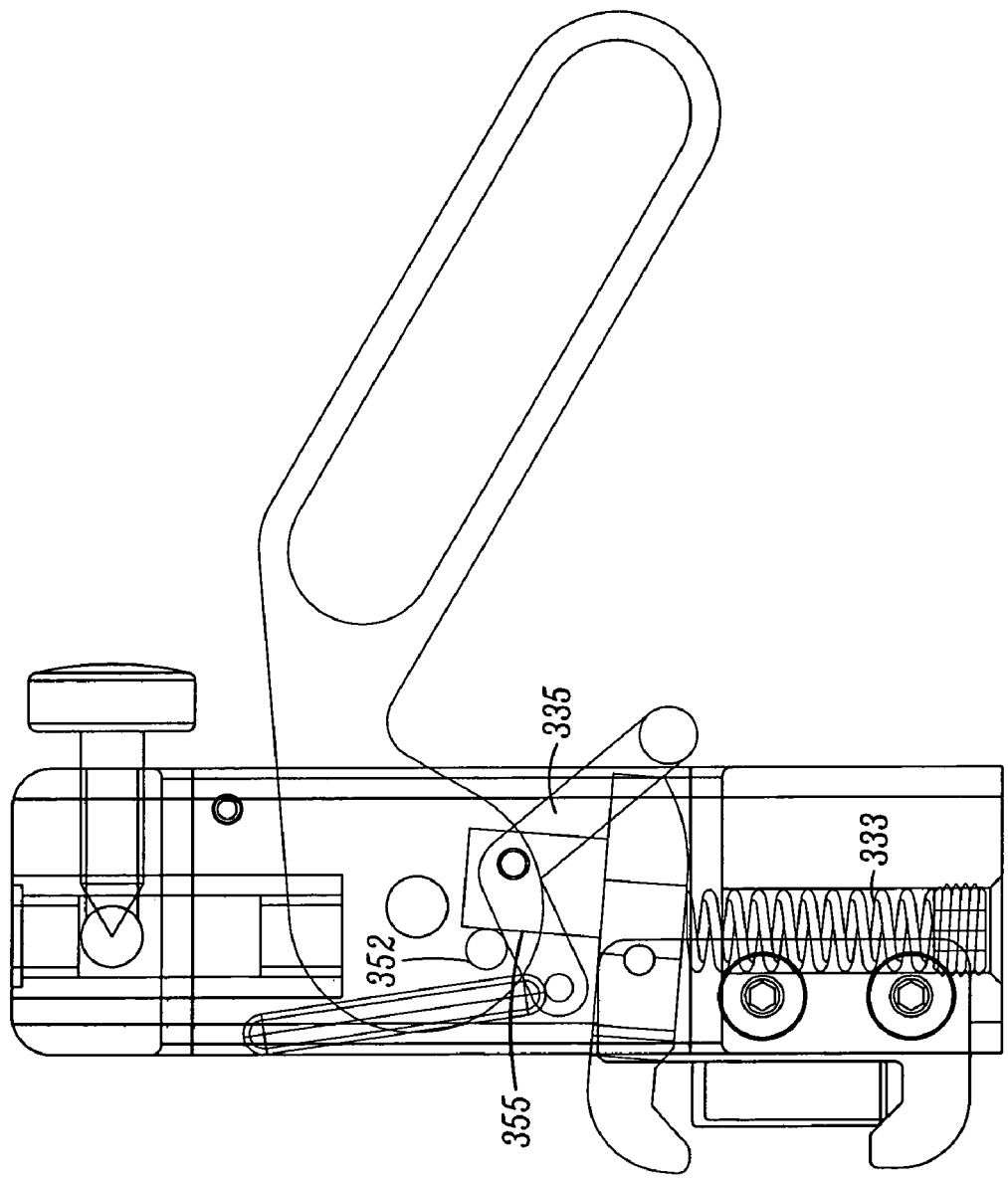
FIG. 8B is a right side parts drawing of the second rail clamp embodiment of FIG. 8A, with the handle rotated from the first handle position by 30 degrees toward an extreme, closed, second handle position.
Figure 8C:
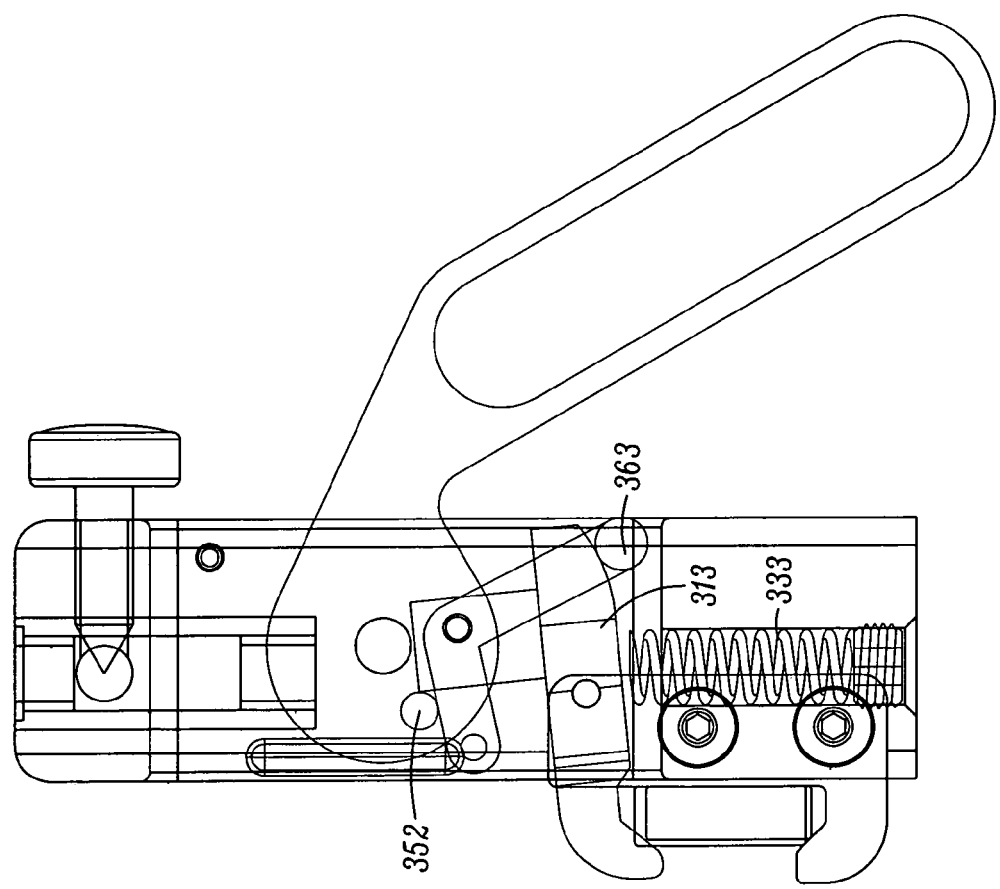
FIG. 8C is a right side parts drawing of the second rail clamp embodiment of FIG. 8A, with the handle rotated from the first handle position by 60 degrees toward the second handle position.
Figure 8D:
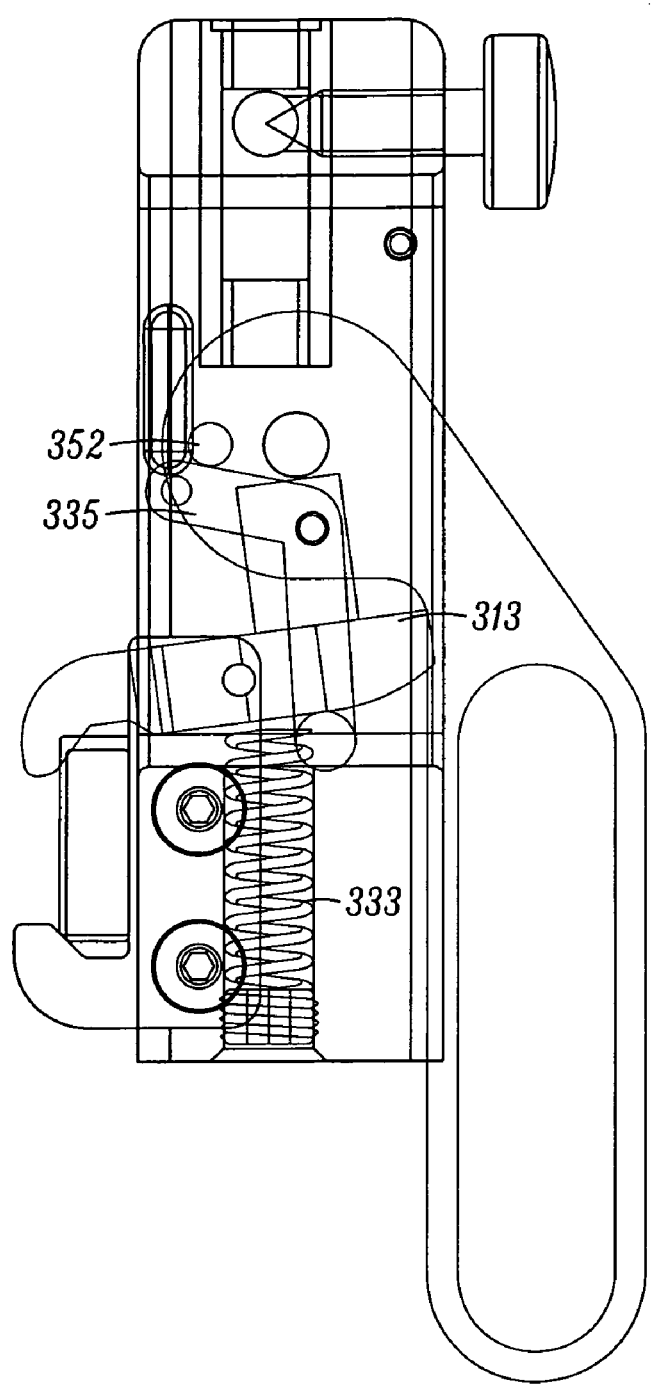
FIG. 8D is a right side parts drawing of the second rail clamp embodiment of FIG. 8A, with the handle rotated from the first handle position by 90 degrees, to be in the second handle position.

Likewise, as with the first embodiment, the actuation mechanism includes a handle 331 that is movable between an extreme, open, first handle position (as depicted in FIG. 8A) and an extreme, closed, second handle position (as depicted in FIG. 8D). The actuation mechanism further includes a swing lock 335, a first bias member in the form of a swing-clamp spring 333, and a pair of second bias members in the form of a pair of a swing-lock springs 337. The swing-clamp spring is again configured and positioned with respect to the swing-clamp axis such that it biases the swing clamp to pivot toward and into its extreme, closed, second position, and thereby, the swing-clamp spring is configured to react between the clamp members to bias the clamp mechanism toward the second clamp-mechanism position. The handle 331 includes a grip 339, defines a pin channel 341, and is hingedly mounted to the housing 307 using a pin extending laterally through a second pair of pin holes in the housing.

Similar to the first embodiment, the swing lock 335 of the actuation mechanism includes a lock member that in combination with the swing-lock springs 337 can lock the swing clamp in progressively more closed positions as it moves under the bias of the swing-clamp spring 333 to (or toward) its position in the extreme, closed, second clamp-mechanism position. More particularly, the swing lock 335 includes two flanges and an intermediate lock member 363 connecting the two identical flanges at an end of each flange. Each flange defines a pin channel 365 in its center, and using one of two respective pins, these pin holes are each hingedly mounted to one of two respective pin holes on one of two respective reception flanges 369 integral with the swing clamp 313. The swing lock is thereby fixedly attached to the swing clamp, but free to pivot around a laterally extending swing-lock axis that moves with respect to the housing as the swing clamp pivots with respect to the housing.

The swing-lock springs 337 bias a second end of each swing-lock flange toward a pin affixed to the housing. This biases the lock member 363 to rotate forward, relative to the swing clamp from a first lock-member position toward an extreme, second lock-member position. The clamp-mechanism swing clamp defines a lock-engagement surface 373 and the housing defines a lock-engagement surface 375 configured such that, as the swing clamp moves through a range of clamp-mechanism positions toward its second clamp-mechanism position, the lock member can engage and become wedged between the lock-engagement surfaces in a range of lock-member positions progressing toward the second lock-member position.

Unlike the first embodiment, the handle 331 is not further configured with a pair of cam surfaces to respectively actuate the swing lock and the swing clamp. Instead, the actuation mechanism handle includes a protrusion 352 extending laterally in both directions from a lateral center of the handle, the protrusion being configured for actuating both the swing lock and the swing clamp. More particularly, with the handle in its extreme, open, first position (FIG. 8A), the protrusion of the actuation mechanism is configured to form an actuation surface to directly actuate two respective actuation surfaces 355 on the two reception flanges 369 that are integral with the swing clamp 313, and to directly actuate actuation surfaces 377 of the two respective flanges of the swing lock 335. Thus, the protrusion is configured to drive the clamp mechanism (and in particular the swing-clamp upper jaw) to move against the bias of the swing-clamp spring 333 to the open, first clamp-mechanism position, and configured to drive the swing lock to move against the bias of the swing-lock springs to the open, first lock-member position.

As depicted for this embodiment (and as is the case for the first embodiment), as the handle is rotated down, the actuation mechanism first allows the clamp members to significantly close, and then releases the swing lock to lock the clamp members together. More particularly, with the handle having progressed 30 degrees toward the second position (see, FIG. 8B), the protrusion 352 has swung forward, letting the swing-clamp actuation surfaces 355 move forward and lefting the swing clamp swing toward a closed position under the bias of the swing-clamp spring 333. However, the relative movement of the protrusion and the swing-lock axis (which moves with the swing clamp) has not yet let the swing lock 335 swing significantly forward (and may have swung it back a little). With the handle having progressed 60 degrees toward the second position (see, FIG. 8C), the protrusion 352 has swung forward and up enough to almost let the swing-clamp 313 move freely under the bias of the swing-clamp spring 333. The relative movement of the protrusion and the swing-lock axis has now allowed the swing-lock lock member 363 to swing forward somewhat, passing under a back end of the swing clamp, and thereby approaching a position where it will be positioned to engage the housing and lock the swing clamp closed.

Finally, when the handle is actuated a full 90 degrees to its extreme, closed, second position (see, FIG. 8D), the protrusion 352 turns such that it no longer contacts or drives the clamp-mechanism swing clamp 313 toward its open, first position. This completely releases the swing clamp to pivot under the bias of the swing-clamp spring 333 to (or toward) its position in the extreme, closed, second clamp-mechanism position. Also, the protrusion turns such that it allows the swing lock 335 to approach its second position (barring the presence of a rail that holds the swing clamp from reaching its second position). Thus, with the handle in its extreme, closed, second position, the actuation mechanism is configured to actuate the clamp mechanism to the second clamp-mechanism position, and in particular, the swing-clamp spring biases the swing clamp to pivot toward its extreme, closed, second position, and the swing-lock spring biases the swing lock toward its extreme, closed, second position.

As with the first embodiment, in its extreme, closed, second position, the clamp mechanism has its clamp members (i.e. the upper and lower jaws) close enough to leave inadequate room for the mount structure rail 303 between them. Thus, if the rail is received between the clamp members while the handle 331 is in its first position, then when the handle is pivoted to its second position, the clamp members will be biased to move toward their extreme, closed, second position, but they will not reach it. Instead, the clamp members will grippingly clamp around the rail under the force of the swing-clamp spring 333, and lock under the control of the swing lock.

Similar to the first embodiment, the actuation mechanism is configured to actuate the swing lock progressively out of the way of the housing lock-engagement surface before and as the clamp mechanism moves toward the open, first clamp-mechanism position. When the handle is moved from its extreme, open, first position, towards its second position, the protrusion controllably releases the respective actuation surfaces, allowing them to move under the bias of their springs. Optionally, if something (such as an incompletely inserted rail) impedes the swing clamp from proceeding from its open, first position significantly toward its second position, then a blocking-surface of the housing may impede the lock member from swinging forward between the lock-engagement surfaces, which may in turn block the handle from reaching its extreme, second handle position.

It is to be understood that the invention comprises both apparatus and related methods for clamping. Additionally, the various embodiments of the invention can incorporate various combinations of the above-described features. While particular forms of the invention have been illustrated and described, it will be apparent that various modifications can be made without departing from the spirit and scope of the invention.

For example, while the described embodiments clamp vertically onto a rail, it would be within the broadest scope of the invention to have a clamp mechanism that clamped in a for-and-aft direction (i.e., toward and away from the table). Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A clamp for attaching a device to a mount structure, comprising:

a clamp mechanism including a first clamp member connected to a second clamp member, the first and second clamp members being movable relative to one another between a first clamp-mechanism position and a second clamp-mechanism position, wherein the first clamp-mechanism position provides adequate clearance for the mount structure to be inserted between the clamp members, and wherein the second clamp-mechanism position leaves inadequate room for the mount structure between the clamp members; and an actuation mechanism including a handle that is movable between a first handle position and an extreme second handle position, and also including a first bias member;

wherein with the handle in its first position, the actuation mechanism is configured to actuate the clamp mechanism to the first clamp-mechanism position;

wherein with the handle in its extreme, second position, the actuation mechanism is configured to actuate the clamp mechanism to the second clamp-mechanism position;

wherein with the handle in its extreme, second position, the first bias member is configured to resiliently bias the clamp members toward their respective second clamp-mechanism positions; and wherein the actuation mechanism further includes a lock member and a second bias member, the lock member being movable relative to the clamp mechanism between a first lock-member position and a second lock-member position, and the second bias member being configured to bias the lock member toward its second position;

the handle is configured to actuate the lock member to its first position when the handle is actuated to its first position;

the clamp mechanism defines a lock-engagement surface configured such that, as the clamp mechanism moves through a range of clamp-mechanism positions toward the second clamp-mechanism position, the lock member can engage the lock-engagement surface in a range of lock-member positions progressing toward the second lock-member position; and through the range of clamp-mechanism positions, the lock member in its respective engaged positions blocks the clamp mechanism from moving back toward the first clamp-mechanism position.

2. The clamp of claim 1, wherein the lock member, in its first position, blocks the handle from reaching its extreme, second position.

3. The clamp of claim 1, wherein the first bias member is configured to react between the first and second clamp members to bias the clamp mechanism toward the second clamp-mechanism position.

4. The clamp of claim 1, wherein the handle includes an actuation surface configured to directly actuate the clamp mechanism to the first clamp-mechanism position.

5. The clamp of claim 1, wherein the handle is not configured to directly actuate the clamp mechanism to the second clamp-mechanism position.

6. The clamp of claim 1, and further comprising:

a housing integrating the clamp mechanism and the actuation mechanism;

a longitudinally extending support member slidably received by the housing, the support member having a reception portion configured for receiving the device; and a manually releasable support lock configured to lock the slidable position of the support member with respect to the housing.

7. The clamp of claim 6, wherein the first and second clamp-mechanism positions define an actuation axis along which the clamp members relatively actuate toward one another, and wherein the support member is slidable in the direction of the actuation axis.

8. The clamp of claim 1, wherein:

the first and second clamp-mechanism positions define an actuation axis along which the clamp members relatively actuate toward one another, the first clamp member includes a first jaw member and a second jaw member spaced apart along a lateral axis that is normal to the actuation axis; and the second clamp member defines a jaw member positioned intermediate the first and second jaw members of the first clamp member, with respect to the lateral axis.

9. The clamp of claim 8, and further comprising:

a housing integrating the clamp mechanism and the actuation mechanism;

a first longitudinally extending support member and a second longitudinally extending support member, the first and second support members being received by the housing and spaced apart along the lateral axis, wherein each support member is longitudinally slidable, with respect to the housing, parallel to the actuation axis, and wherein each support member has a reception portion configured for receiving the device; and a manually releasable support lock configured to lock the position of the first and second support members with respect to the housing.

10. A clamp for attaching a device to a mount structure, comprising:

a clamp mechanism including a first clamp member connected to a second clamp member, the first and second clamp members being movable relative to one another between a first clamp-mechanism position and a second clamp-mechanism position, wherein the first clamp-mechanism position provides adequate clearance for the mount structure to be inserted between the clamp members, and wherein the second clamp-mechanism position leaves inadequate room for the mount structure between the clamp members; and an actuation mechanism including a handle that is movable between a first handle position and an extreme, second handle position, and further including a lock member movable relative to the clamp mechanism between a first lock-member position and a second lock-member position, and further including a bias member configured to bias the lock member toward its second position;

wherein with the handle in its first position, the actuation mechanism is configured to actuate the clamp mechanism to its first position, and to actuate the lock member to its first position;

wherein with the handle in its extreme, second position, the actuation mechanism is configured to actuate the clamp mechanism toward the second clamp-mechanism position; and wherein the clamp mechanism defines a lock-engagement surface configured such that, as the clamp mechanism moves through a range of clamp-mechanism positions toward the second clamp-mechanism position, the lock member can engage the lock-engagement surface in a range of lock-member positions progressing toward the second lock-member position.

* * * * *